(12) United States Patent
Ju et al.

(10) Patent No.: US 8,364,956 B2
(45) Date of Patent: Jan. 29, 2013

(54) SECURITY MANAGEMENT SERVER AND IMAGE DATA MANAGING METHOD THEREOF

(75) Inventors: Hong Il Ju, Daejeon (KR); Yong-Sung Jeon, Daejeon (KR); Jin Hee Han, Daejeon (KR); Geonwoo Kim, Daejeon (KR); SuGil Choi, Daejeon (KR); Moo Seop Kim, Daejeon (KR); Young Sae Kim, Daejeon (KR); Jong-Wook Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 294 days.

(21) Appl. No.: 12/775,029

(22) Filed: May 6, 2010

(65) Prior Publication Data

US 2011/0145574 A1    Jun. 16, 2011

(30) Foreign Application Priority Data

Dec. 14, 2009   (KR) .......................... 10-2009-0123770

(51) Int. Cl.
*H04L 29/06* (2006.01)
*G06F 11/30* (2006.01)
(52) U.S. Cl. ............... 713/166; 713/189; 726/2; 726/27
(58) Field of Classification Search ................... 713/166
See application file for complete search history.

(56) References Cited

U.S. PATENT DOCUMENTS

| | | | | |
|---|---|---|---|---|
| 6,362,852 B2 * | 3/2002 | Ito | ................................. | 348/345 |
| 6,801,999 B1 * | 10/2004 | Venkatesan et al. | .......... | 713/167 |
| 7,562,397 B1 * | 7/2009 | Mithal et al. | .................... | 726/33 |
| 8,040,828 B2 * | 10/2011 | Kim et al. | ..................... | 370/311 |
| 2004/0133547 A1 * | 7/2004 | Doi | ................... | 707/1 |
| 2005/0248802 A1 | 11/2005 | Nomura et al. | | |
| 2008/0208875 A1 * | 8/2008 | Friedlander et al. | .......... | 707/100 |

FOREIGN PATENT DOCUMENTS

KR   10-2006-0033768 A   4/2006
KR   10-2007-0078451 A   8/2007

* cited by examiner

*Primary Examiner* — Taghi Arani
*Assistant Examiner* — Mohammad L Rahman
(74) *Attorney, Agent, or Firm* — Kile Park Goekjian Reed & McManus PLLC

(57) ABSTRACT

A security management server includes an input unit for receiving image data from at least one network camera; a control unit for assigning an access authority level to each image data received via the input unit; and a storage unit for storing therein the image data along with the access authority levels assigned by the control unit. When receiving a request for a specific image data among the image data stored in the storage unit from a user having a user access authority level, the control unit compares the user access authority level and the access authority level assigned to the specific image data, and based on comparison result thereof, selectively provides the specific image data to the user.

10 Claims, 7 Drawing Sheets

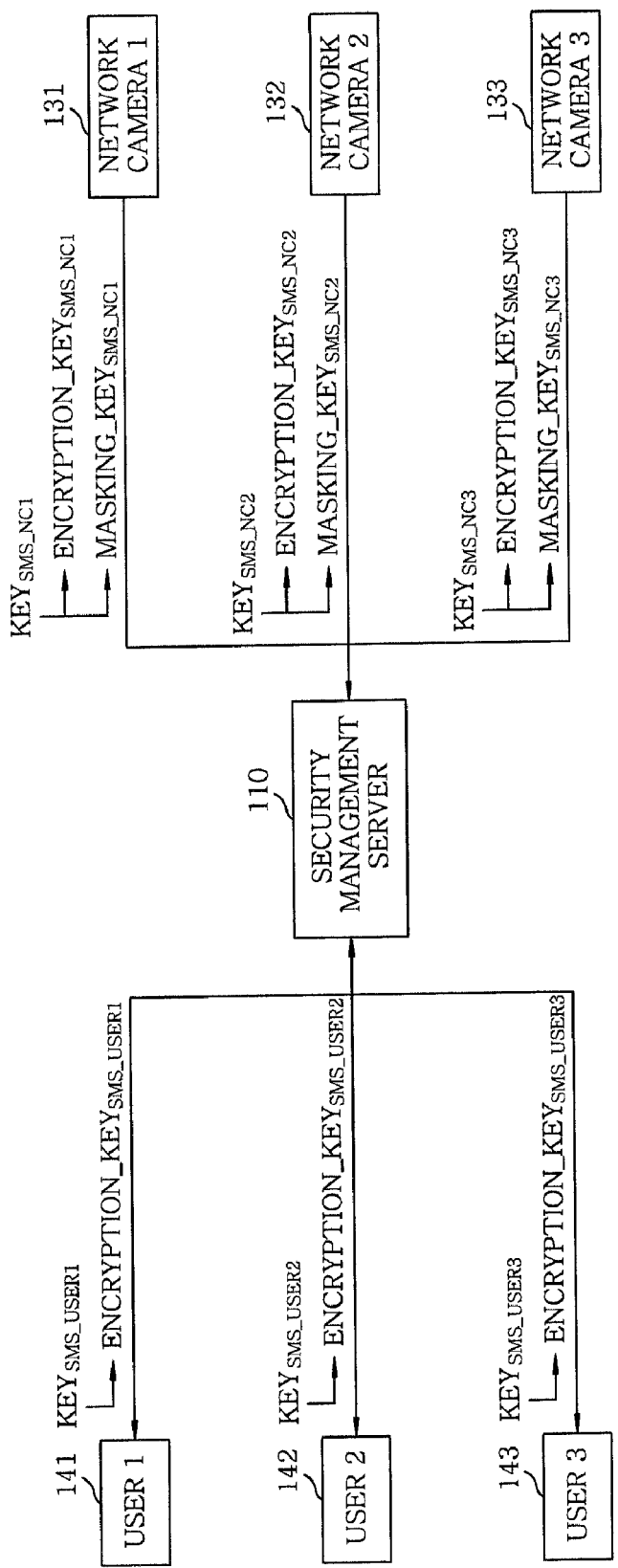

FIG.4

| ACCESS AUTHORITY LEVEL | IMAGE DATA | ENCRYPTION KEY | MASKING KEY |
|---|---|---|---|
| 1 | [IMAGE_DATA_1]$_{\text{ENCRYPTION\_KEY\_1}}$ | [ENCRYPTION_KEY_1]$_{\text{KEY\_1}}$ | [MASKING_KEY_1]$_{\text{KEY\_1}}$ |
| 1 | [IMAGE_DATA_2]$_{\text{ENCRYPTION\_KEY\_2}}$ | [ENCRYPTION_KEY_2]$_{\text{KEY\_2}}$ | [MASKING_KEY_2]$_{\text{KEY\_2}}$ |
| 2 | [IMAGE_DATA_3]$_{\text{ENCRYPTION\_KEY\_3}}$ | [ENCRYPTION_KEY_3]$_{\text{KEY\_3}}$ | [MASKING_KEY_3]$_{\text{KEY\_3}}$ |
| ... | ... | ... | ... |
| 2 | [IMAGE_DATA_N]$_{\text{ENCRYPTION\_KEY\_N}}$ | [ENCRYPTION_KEY_N]$_{\text{KEY\_N}}$ | [MASKING_KEY_N]$_{\text{KEY\_N}}$ |

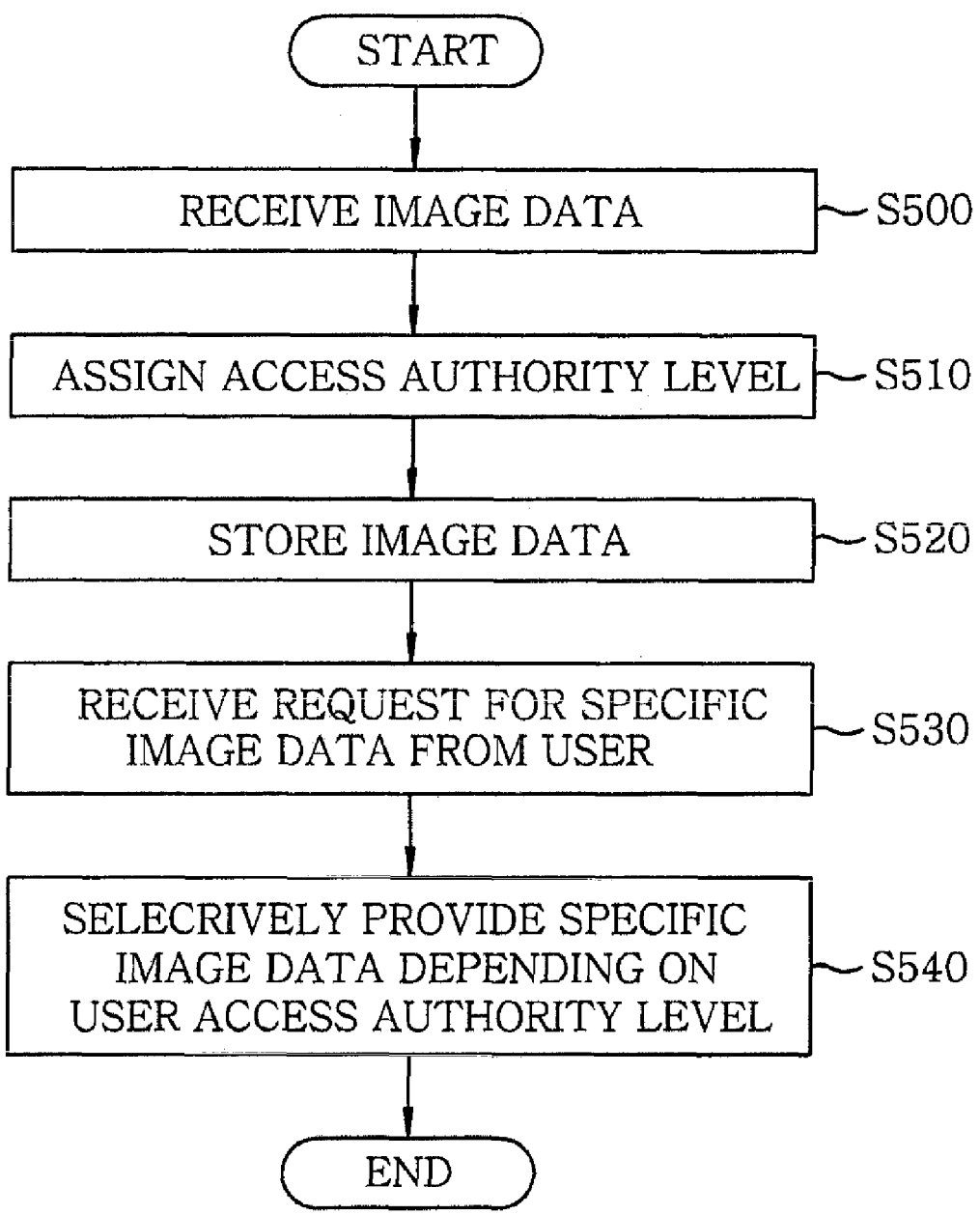

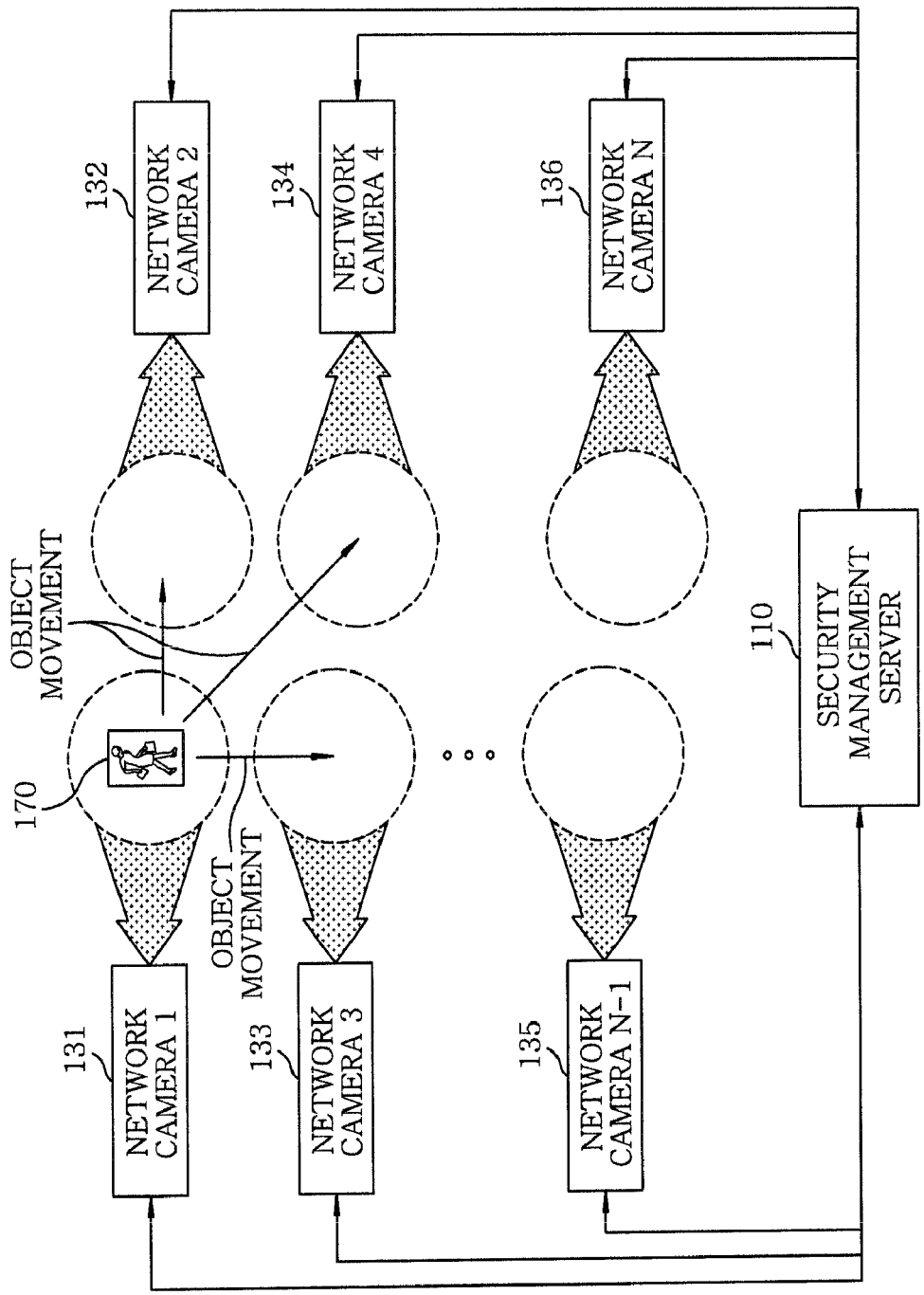

SECURITY MANAGEMENT SERVER AND IMAGE DATA MANAGING METHOD THEREOF

CROSS-REFERENCE TO RELATED APPLICATION(S)

The present invention claims priority to Korean Patent Application No. 10-2009-0123770, filed on Dec. 14, 2009, which is incorporated herein by reference.

FIELD OF THE INVENTION

The present invention relates to a security management server and an image data managing method thereof; and, more particularly, to a security management server which allows a user to monitor and retrieve image data received from network cameras, depending on an access authority level of the user.

BACKGROUND OF THE INVENTION

As well-known in the art, image security system or monitoring system technologies for personal security using CCTV (Closed Circuit Television) cameras that are conventional analog cameras or network cameras have been developed. One of recent issues in the market is that the existing analog cameras are being changed to the network cameras, both of which coexist at present. Therefore, due to the appearance of the network cameras, users can connect to the network cameras to access or monitor image data collected by the network cameras under the environment where they are connected to a network anytime and anywhere. The appearance of the network cameras provides the above-stated convenience, but induces the security problem as well, thus causing the problem of an invasion of personal privacy. Thus, in order to solve this security problem, user authentication is required and image data needs to be encrypted upon transmission thereof. Further, to guard personal privacy against photo shooting that is unintentionally done in many image data, a privacy masking technique is often used.

In case of using the conventional analog camera, an image is taken by the analog camera, and digitalized and compressed by a DVR (Digital Video Recorder), which is an image storage device and connected to the analog camera via a coaxial cable or the like. Meanwhile, in case of using the network camera, the digitalization and compression functions are performed by the network camera itself. Also, the network camera is connected to an NVR (Network Video Recorder), which is an image storage device, via a wired/wireless network line such that the monitoring and management services can be conducted. In addition, as the performance of the network camera is improved, an image is also encoded and encrypted by the network camera for safe transmission thereof to the NVR or a video server. Therefore, a user who wants to monitor image data can monitor the desired image data by decrypting and decoding the safely encrypted image data.

However, this addition of the encryption function for security requires a method for safely storing and managing the image data and also requires differentiated image data that can be accessed depending on the user's authority. Thus, the user's personal security can be ensured more safely only when such security policy is conducted by a security management server that stores and manages the image data.

SUMMARY OF THE INVENTION

In view of the above, the present invention provides a security management server which allows a user to monitor and retrieve image data received from network cameras, depending on an access authority level of the user, and an image data managing method of the security management server.

Further, the present invention provides a security management server which can more efficiently track a target object in conjunction with network cameras, and an image data managing method of the security management server.

In accordance with an aspect of the present invention, there is provided a security management server, including:

an input unit for receiving image data from at least one network camera;

a control unit for assigning an access authority level to each image data received via the input unit; and a storage unit for storing therein the image data along with the access authority levels assigned by the control unit, wherein, when receiving a request for a specific image data among the image data stored in the storage unit from a user having a user access authority level, the control unit compares the user access authority level and the access authority level assigned to the specific image data, and based on comparison result thereof, selectively provides the specific image data to the user.

Preferably, the specific image data is provided to the user only if user authentication between the user and the security management server is succeeded.

Preferably, the image data is encrypted by the network camera before being transmitted to the security management server.

Preferably, the image data is spatially or temporally masked by the network camera before being transmitted to the security management server.

Preferably, the image data is encrypted by using an encryption key.

Preferably, the image data is masked by using a masking key.

Preferably, the user access authority level is classified into a low, a medium and a high level. If the user access authority level is the low level, the control unit provides to the user the specific image data only. If the user access authority level is the medium level, the control unit provides to the user the specific image data along with the encryption key. If the user access authority level is the high level, the control unit provides to the user the specific image data along with the encryption key and the masking key.

Preferably, the control unit transmits to the network camera an object tracking command along with feature information of a tracking target object.

Preferably, when one network camera finds the tracking target object, the control unit notifies other network cameras that the tracking target object has been found.

Preferably, the control unit assigns the access authority level to each image data based on a location where the network camera is installed and a time when the network camera transmits the image data to the security management server.

In accordance with another aspect of the present invention, there is provided an image data managing method of a security management server, the method including:

receiving image data from at least one network camera;

assigning an access authority level to each image data;

storing the image data along with the access authority levels;

comparing, when receiving a request for a specific image data from a user having a user access authority level, the user access authority level and the access authority level assigned to the specific image data; and selectively providing the specific image data to the user based on comparison result of the user access authority level and the access authority level assigned to the specific image data.

The method may further include performing user authentication for the user, wherein the specific image data is provided to the user only if the user authentication is succeeded.

Preferably, the image data is encrypted by the network camera before being transmitted to the security management server.

Preferably, the image data is spatially or temporally masked by the network camera before being transmitted to the security management server.

Preferably, the image data is encrypted by using an encryption key.

Preferably, the image data is masked by using a masking key.

Preferably, the user access authority level is classified into a low, a medium and a high level, and said selectively providing the specific image data to the user includes: providing to the user the specific image data only, if the user access authority level is the low level; providing to the user the specific image data along with the encryption key, if the user access authority level is the medium level; and providing to the user the specific image data along with the encryption key and the masking key, if the user access authority level is the high level.

The method may further include transmitting to the network camera an object tracking command along with feature information of a target object.

The method may further include after said transmitting the feature information, notifying, when one network camera finds the tracking target object, other network cameras that the tracking target object has been found.

Preferably, in said assigning the access authority level, the access authority level is assigned to each image data based on a location where the network camera is installed and a time when the network camera transmits the image data to the security management server.

According to the present invention, the security management server can establish a secured connection with each network camera via device authentication. The security management server receives image data from the network camera via the connection, and then stores and manages the image data.

Further, since the image data is encrypted by the network camera, the security management server need not to encrypt the image data before storing the image data.

Further, the image data is stored along with an access authority level assigned thereto. When a user having a user access authority level succeeds in user authentication, the security management server compares the access authority level assigned to the image data and the user access authority level, and based on comparison result provide the image data to the user.

Furthermore, a moving object can be tracked more easily based on device authentication between a security management server and network cameras, rather than based on authentication and message exchange between network cameras in an image security system. In this case, the security management server may be operated as a master device and the network cameras connected thereto may be operated as slave devices.

BRIEF DESCRIPTION OF THE DRAWINGS

The above and other objects and features of the present invention will become apparent from the following description of embodiments, given in conjunction with the accompanying drawings, in which:

FIG. 3 illustrates a key generation process performed after a user authentication process and a device authentication process among the users, the security management server and the network cameras of FIG. 1;

FIG. 4 illustrates information stored in the security management server for each image data;

FIG. 5 illustrates a flowchart of an image data managing method of the security management server of FIG. 1;

FIG. 7 illustrates an explanatory view for object tracking on a moving object based on the device authentication between the security management server and the network cameras of FIG. 1.

DETAILED DESCRIPTION OF THE EMBODIMENTS

Hereinafter, embodiments of the present invention will be described in detail with reference to the accompanying drawings, which form a part hereof.

In this description, the term "image data" is used to indicate all types of video data including one or more images, e.g., still images, moving pictures and streaming video.

Figure 1:
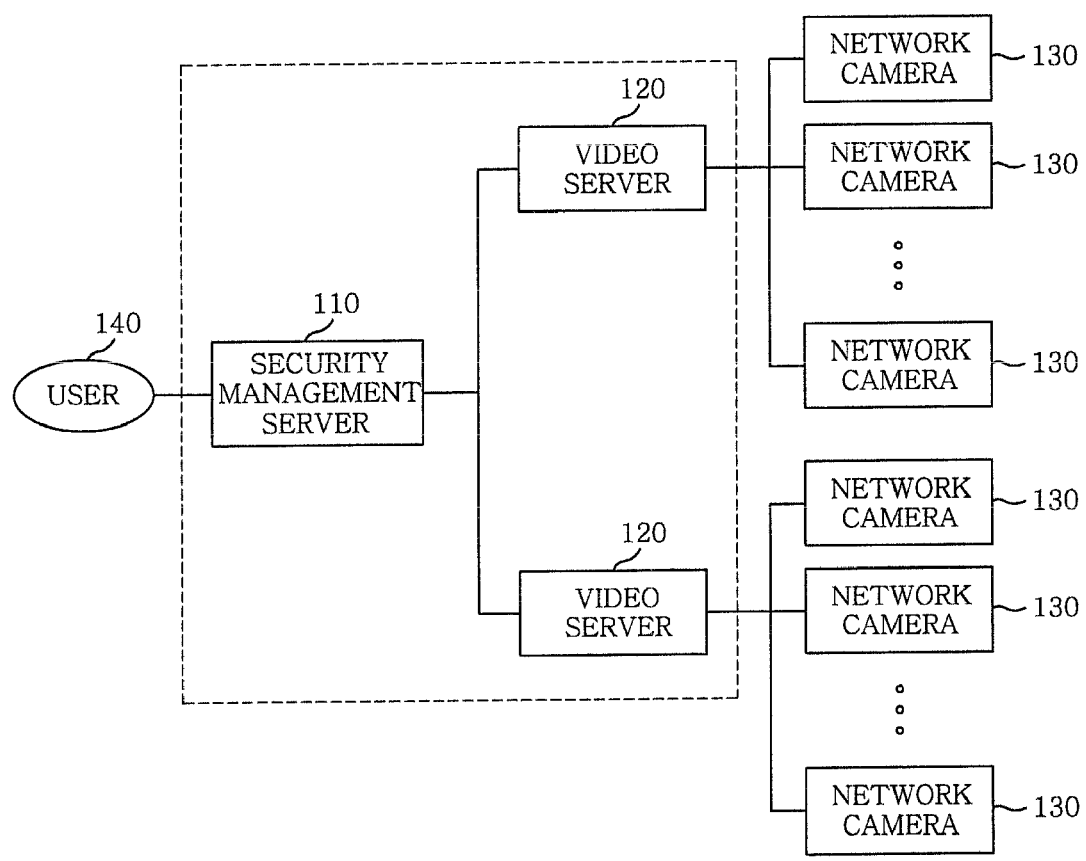
FIG. 1 illustrates a configuration view of a security monitoring system using network cameras in accordance with the present invention.

FIG. 1 illustrates a configuration view of a security monitoring system using network cameras in accordance with the present invention. As shown in FIG. 1, the security monitoring system using network cameras includes a security management server 110, at least one video server 120, network cameras 130 and a user 140.

The security management server 110 is connected to the video server 120 and the user 140, such that the security management server 110 receives image data from the network cameras 130 via the video server 120 and selectively provides the image data to the user in response to a request for the image data from the user 140.

The video server 120 stores the image data received from the network cameras 130. The video server 120 may be incorporated in the security management server 110, when necessary. To simplify the security monitoring system, the functions of the video server 120 may be included in the security management server 110.

The network cameras 130 and the user 140 are required to be registered in the security management server 110.

From this, a mutual authentication process needs to be executed between the network cameras 130 and the security management server 110, and successful user authentication for the user 140 desiring to monitor an image needs to be carried out. Further, even if the user succeeded in the user authentication, he or she can monitor only image data accessible under the access control policy of the security management server 110, which will be described in detail later.

Hereinafter, the function of the video server 120 is supposed to be included in the security management server 110, and the security management server 110 is directly connected to the network cameras 130.

Figure 2:
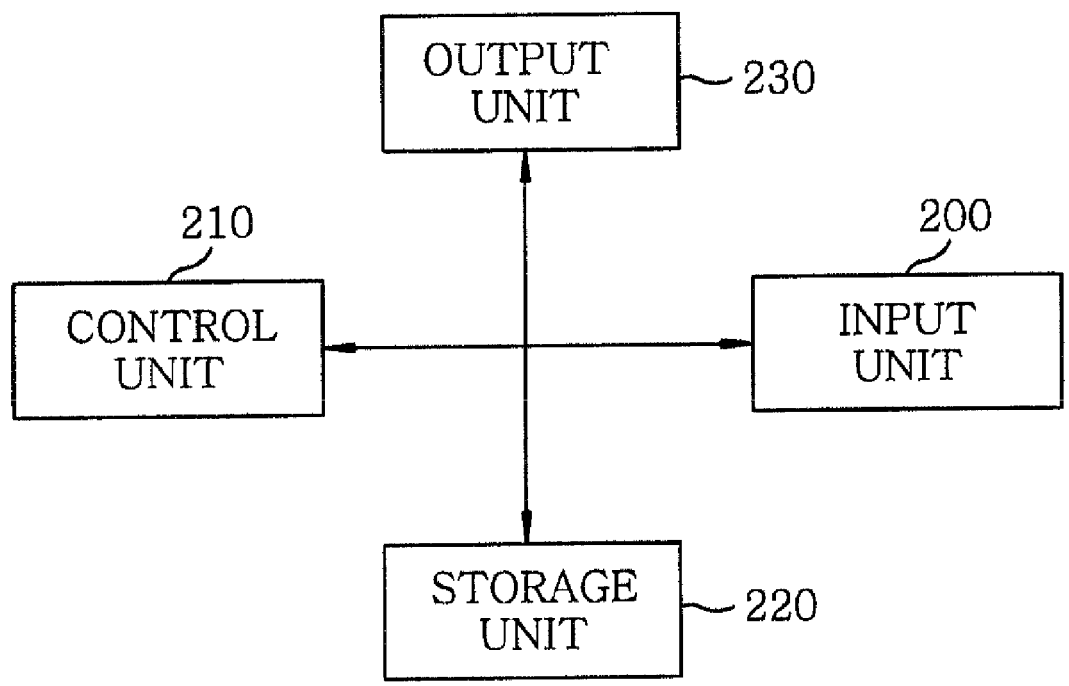
FIG. 2 illustrates a detailed block diagram of the security management server of FIG. 1.

FIG. 2 illustrates a detailed block diagram of the security management server of FIG. 1.

As shown in FIG. 2, the security management server 110 includes an input unit 200, a control unit 210, a storage unit 220 and an output unit 230. The input unit 200 receives image data from the network cameras 130. The image data are collected by the network cameras 131 to 133 and encrypted before being transmitted to the security management server 110.

The control unit 210 assigns an access authority level to each image data received via the input unit.

The storage unit 220 stores therein the image data along with the access authority levels assigned by the control unit 210.

The output unit 240 provides the stored image data to an authenticated user under a control of the control unit 210, thereby allowing the authenticated user to monitor images taken by the network cameras 130.

To be specific, when receiving a request for a specific image data among the image data stored in the storage unit from the user 140 having a user access authority level assigned to the user 140, the control unit 210 compares the user access authority level and the access authority level assigned to the specific image data, and based on comparison result thereof, selectively provides the specific image data to the user 140.

Regarding the access authority level, the control unit 210 assigns an access authority level to each image data based on a region where a network camera is located and a time when the network camera provides the image data. For example, if a network camera is located in a specific region and provides image data to the security management server 110 at a specific time, the image data provided by the network camera can be accessible only by a specific user, e.g., a system administrator. Therefore, in order to selectively provide the image data to a user, the access authority level may be stored in the storage unit 220 along with the image data.

FIG. 3 illustrates a key generation process performed after a user authentication process and a device authentication process among the users, the security management server and the network cameras of FIG. 1. As shown in FIG. 3, the device authentication process is executed between each of the network cameras 131 to 133 and the security management server 110. As a result of the device authentication process, master keys $KEY_{SMS\_NC1}$ to $KEY_{SMS\_NC3}$ are shared between the security management server 110 and the network cameras 131 to 133, respectively. Based on the master keys $KEY_{SMS\_NC1}$ to $KEY_{SMS\_NC3}$, encryption keys $ENCRYPTION\_KEY_{SMS\_NC1}$ to $ENCRYPTION\_KEY_{SMS\_NC3}$ for use in encryption of the image data and masking keys $MASKING\_KEY_{SMS\_NC1}$ to $MASKING\_KEY_{SMS\_NC3}$ for use in privacy masking are generated for the network cameras 131 to 133, respectively.

Whenever a session between the security management server 110 and a specific network camera is newly created, the encryption and masking key between the security management server 110 and the specific network camera are generated and then may be used as a session key for the session.

The user authentication process is carried out between the security management server 110 and each of users 141 to 143. As a result of the user authentication process, master keys $KEY_{SMS\_USER1}$ to $KEY_{SMS\_USER3}$ are shared between the security management server 110 and the users 141 to 143. Based on the master keys $KEY_{SMS\_USER1}$ to $KEY_{SMS\_USER3}$, encryption keys $ENCRYPTION\_KEY_{SMS\_USER1}$ to $ENCRYPTION\_KEY_{SMS\_USER3}$ for use in encryption of the image data is generated for the users 141 to 143. The encryption keys $ENCRYPTION\_KEY_{SMS\_USER1}$ to $ENCRYPTION\_KEY_{SMS\_USER3}$ thus generated may be also used to protect not only transmission of the image data but also transmission of control messages.

Whenever a session between the security management server 110 and a specific user is newly created, the encryption key between the security management server 110 and the specific user is generated and then may be used as a session key for the session.

FIG. 4 illustrates information stored in the security management server 110 for each image data.

As shown in FIG. 4, each image data is stored in the security management server 110 along with an access authority level assigned to the image data, an encryption key used in encryption of the image data and a masking key used in private masking of the image data. In FIG. 4, $[X]_Y$ represents that X is encrypted by using Y.

Each of image data IMAGE_DATA_1 to IMAGE_DATA_N is stored as it is received from a network camera, i.e., as it is encrypted by using respective encryption keys ENCRYPTION_KEY_1 to ENCRYPTION_KEY_N. The encryption keys ENCRYPTION_KEY_1 to ENCRYPTION_KEY_N and masking keys MASKING_KEY_1 to MASKING_KEY_N, which are generated from master keys KEY_1 to KEY_N shared during the device authentication process for network cameras, are stored as being encrypted by using the master keys KEY_1 to KEY_N.

In a state where information on each image data is stored as shown in FIG. 4, the security management server 110 selectively provides the image data, the encryption key and the masking key to the user 140, based on the user access authority level of the user 140. In FIG. 4, the image data IMAGE_DATA_1 to IMAGE_DATA_N are arranged in an ascending order of access authority levels assigned thereto, for example.

First, if the user access authority level of the user 140 is equal to or higher than the preset level for the access authority level of 2, the user 140 can be provided with the encrypted image data $[IMAGE\_DATA\_1]_{ENCRYPTION\_KEY\_1}$ to $[IMAGE\_DATA\_3]_{ENCRYPTION\_KEY\_3}$. However, if the user access authority level of the user 140 is equal to or higher than a preset level for the access authority level of 1 but lower than a preset level for the access authority level of 2, the user 140 can be provided with the encrypted image data $[IMAGE\_DATA\_1]_{ENCRYPTION\_KEY\_1}$ and $[IMAGE\_DATA\_2]_{ENCRYPTION\_KEY\_2}$ but cannot be provided with the encrypted image data $[IMAGE\_DATA\_3]_{ENCRYPTION\_KEY\_3}$ to $[IMAGE\_DATA\_N]_{ENCRYPTION\_KEY\_N}$.

Second, even if the user 140 is provided with the encrypted image data $[IMAGE\_DATA\_1]_{ENCRYPTION\_KEY\_1}$, the encryption key ENCRYPTION_KEY_1 and the masking key MASKING_KEY_1 are also selectively provided to the user 140, based on the user access authority level of the user 140. That is, depending on the user access authority level, the user 140 can be provided with the encrypted image data $[IMAGE\_DATA\_1]_{ENCRYPTION\_KEY\_1}$ only, provided with the encrypted image data $[IMAGE\_DATA\_1]_{ENCRYPTION\_KEY\_1}$ and the encryption key ENCRYPTION_KEY_1 only, or provided with all of the encrypted image data $[IMAGE\_DATA\_1]_{ENCRYPTION\_KEY\_1}$, the encryption key ENCRYPTION_KEY_1 and the masking key MASKING_KEY_1.

As a result, if the user 140 is provided with the encrypted image data $[IMAGE\_DATA\_1]_{ENCRYPTION\_KEY\_1}$ only, the user 140 cannot see the image data IMAGE_DATA_1 because the user 140 cannot decrypt the encrypted image data $[IMAGE\_DATA\_1]_{ENCRYPTION\_KEY\_1}$. If the user 140 is provided with the encrypted image data $[IMAGE\_DATA\_1]_{ENCRYPTION\_KEY\_1}$ and the encryption key ENCRYPTION_KEY_1 only, the user 140 can decrypt the encrypted image data $[IMAGE\_DATA\_1]_{ENCRYPTION\_KEY\_1}$ and see the image data $[IMAGE\_DATA\_1]_{ENCRYPTION\_KEY\_1}$, but still cannot remove masked portions of the image data IMAGE_DATA_1. If the user 140 is provided with all of the encrypted image data [IMAGE_DATA_1]$_{ENCRYPTION\_KEY\_1}$, the encryption key ENCRYPTION_KEY_1 and the masking key MASKING_KEY_1, the user 140 can see the image data IMAGE_DATA_1 without having the masked portions.

FIG. 5 illustrates a flowchart of an image data managing method of the security management server 110 of FIG. 1.

As shown in FIG. 5, the security management server receives image data from the network cameras 130 via the input unit 200 (step S500). Each of the network cameras 130 collects and encrypts image data by using the encryption key and then transmits thus encrypted image data to the security management server 110. Further, each of the network cameras 130 may spatially or temporally mask the image data by using the masking key before transmitting the image data to the security management server 110.

The control unit 210 of the security management server 110 assigns each of the image data received in the step S500 with an access authority level (step S510). The access authority level may be assigned based on a location where the network camera 130 transmitting the image data is installed and a time when the network camera 130 provides the image data to the security management server 110.

The control unit 210 stores, in the storage unit 220, the image data received in the step S500 along with the access authority levels assigned in the step S510 (step S520).

The control unit 210 receives from the user 140 a request for a specific image data among the image data stored in the step S520 (step S530).

In response to the request from the user 140 received in the step S530, the security management server 110 selectively provides the specific image data to the user 140 via the output unit 230, based on comparison result of a user access authority level of the user 140 and the access authority level assigned to the specific image data (step S540). Further, depending on the user access authority level, the user 140 can be provided with the encrypted data only, provided with the encrypted data and the encryption key only, or provided with all of the encrypted data, the encryption key and the masking key, which will be described in detail with reference to FIG. 6.

Figure 6:
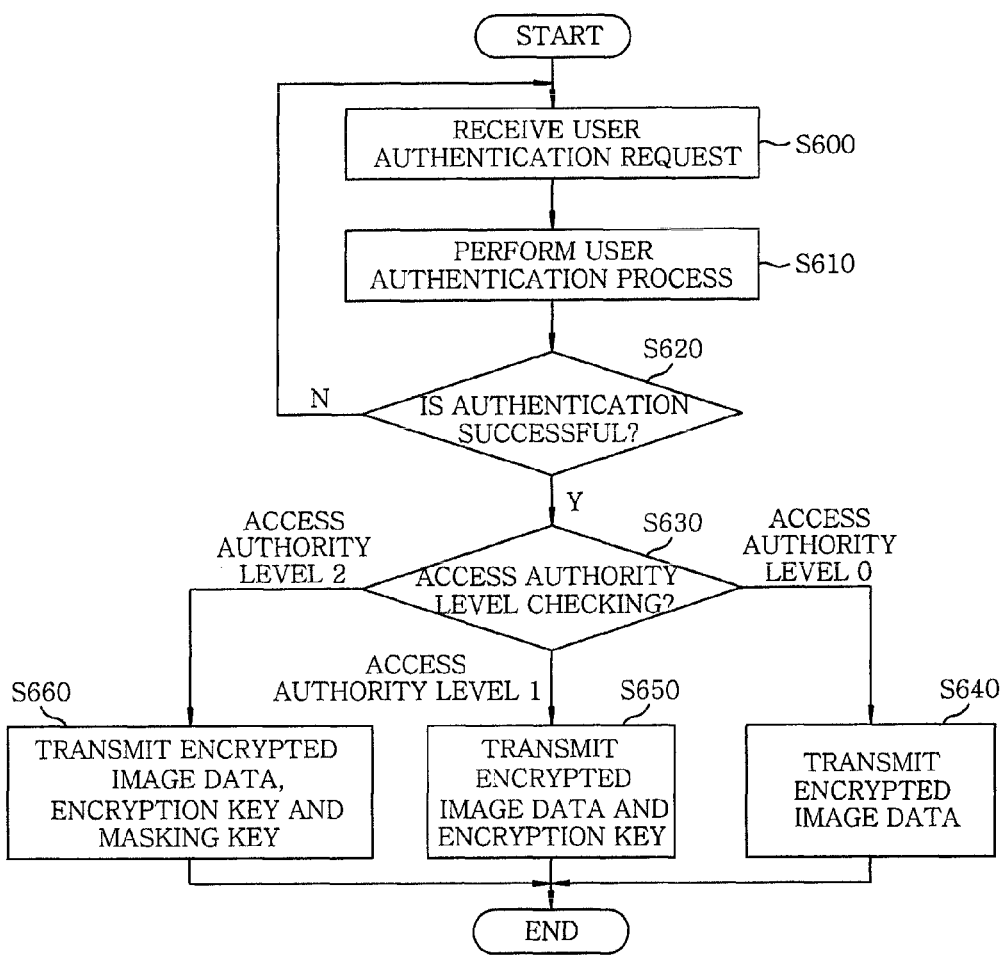
FIG. 6 illustrates a detailed flowchart of the step S540 of FIG. 5.

FIG. 6 illustrates a detailed flowchart of the step S540 of FIG. 5.

In FIG. 6, it is assumed that there exist three authority levels 0 to 2. The access authority level of 0 is the lowest level, the access authority level of 1 is the middle level, and the access authority level of 2 is the highest level. It should be noted that the access authority levels may be set differently depending on the security policy. The access authority level of 0 indicates that access to the image data is allowed but the image data cannot be seen. The access authority level of 1 indicates that the image data can be seen but specific objects masked in the image data cannot be seen. The access authority level of 2, which is the highest level and may be assigned to a system administrator, indicates that all objects are unmasked and thus the original image data can be seen.

As shown in FIG. 6, the security management server 110 receives a user authentication request from the user 140 desiring to monitor the specific image data (step S600).

In response to the user authentication request received in the step S600, the control unit 210 of the security management server 110 performs a user authentication process (step S610). During the user authentication process an encryption key is generated and shared between the security management server 110 and the user 140, as shown in FIG. 3. If the authentication fails in the step S620, the control returns to the step S600.

If the user authentication is successful in the step S620, the control unit 210 of the security management server 110 checks the access authority level of the user 140 (step S630).

If the user 140 has an access authority level of 0, the control unit 210 transmits to the user 140 the encrypted image data only (step S640). Accordingly, since the encryption key used by the network camera 130 to encrypt the image data is not provided to the user 140, the user 140 cannot decrypt the encrypted image data and cannot see the image data.

If the user 140 has an access authority level of 1, the control unit 210 transmits to the user 140 the encrypted image data along with the encryption used by the network camera 130 to encrypt the image data (step S650). Accordingly, the user 140 can decrypt the encrypted image data. However, since the masking key is not provided to the user 140, the user cannot unmask the masked portions in the image data. That is, the user 140 can only see an image data spatially or temporally masked portions.

If the user has an access authority level of 2, the control unit 210 transmits to the user 140 the encrypted image data along with the encryption key used by the network camera 130 to encrypt the image data and the masking key used by the network camera 130 to perform spatial or temporal masking on the image data (step S660). Accordingly, the user 140 can decrypt the encrypted image data, remove masked portions in the image data and see the original image data. At this time, the masking key and the encryption key are transmitted to the user 140 while being encrypted with an encryption key shared between the security management server 110 and the user 140, which is generated during the user authentication process in the step S610.

According to the above-described method, even if a user is authenticated, opening levels of image data to the user are differentiated depending on the user access authority level, thereby more effectively guaranteeing personal security.

FIG. 7 illustrates an explanatory view for object tracking on a moving object based on the device authentication between the security management server and the network cameras of FIG. 1.

As shown in FIG. 7, the network cameras 131 to 136 collect image data taken at locations where they are installed and then transmit the image data to the security management server 110. Under the above-described condition, when it is necessary to track a moving object, i.e., a tracking target 170 such as a person, automobile and the like, the security management server 110 transmits to the network cameras 131 to 136 an object tracking command along with feature information on the tracking target 170. Upon receipt of the object tracking command, the network cameras 131 to 136 try to find, in the image data collected thereby, an object matching with the feature information the tracking target 170. If the network camera 131 finds the tracking target 170, the network camera 131 transmits to the security management server 110 an identification message indicating that the tracking target 170 has been found, and then starts to track the tracking target 170. Meanwhile, upon reception of the identification message from the network camera 131, the security management server 110 notifies the network cameras 132 to 136 that the tracking target 170 has been already found.

Further, if the tracking target 170 moves out of the range of the network camera 131 during the object tracking, the network camera 131 transmits to the security management server 110 a message indicating such movement of the tracking target 170. Upon receipt of this message, the security management server 110 again transmits the object tracking command to all the network cameras 131 to 136, thereby continuing the object tracking. By repeating this procedure, it is possible to track the tracking target 170 moving around the security management server 110. As described above, object tracking can be accomplished by using secure channels established between the security management server 110 and the respective network cameras 131 to 136.

While the invention has been shown and described with respect to the particular embodiments, it will be understood by those skilled in the art that various changes and modification may be made.

What is claimed is:

1. A security management server, comprising:
an input unit configured to receive image data from at least one network camera;
a control unit configured to assign an access authority level to each image data received via the input unit; and
a storage unit configured to store therein the image data along with the access authority levels assigned by the control unit,
wherein, when receiving a request for specific image data among the image data stored in the storage unit from a user having a user access authority level, the control unit compares the user access authority level and the access authority level assigned to the specific image data, and based on a comparison result thereof, selectively provides the specific image data to the user,
wherein the image data is encrypted by the network camera before being transmitted to the security management server,
wherein the image data is spatially or temporally masked by the network camera before being transmitted to the security management server,
wherein the image data is encrypted by using an encryption key,
wherein the image data is masked by using a masking key,
wherein the user access authority level is classified into a low, a medium, or a high level,
wherein if the user access authority level is the low level, the control unit provides to the user the specific image data only,
wherein if the user access authority level is the medium level, the control unit provides to the user the specific image data along with the encryption key, and
wherein if the user access authority level is the high level, the control unit provides to the user the specific image data along with the encryption key and the masking key.

2. The security management server of claim 1, wherein the specific image data is provided to the user only if user authentication between the user and the security management server is successful.

3. The security management server of claim 1, wherein the control unit is configured to transmit to the network camera an object tracking command along with feature information of a tracking target object.

4. The security management server of claim 3, wherein, when one network camera finds the tracking target object, the control unit notifies other network cameras that the tracking target object has been found.

5. The security management server of claim 1, wherein the control unit is configured to assign the access authority level to each image data based on a location where the network camera is installed and a time when the network camera transmits the image data to the security management server.

6. An image data managing method of a security management server, the method comprising:
receiving image data from at least one network camera;
assigning an access authority level to each image data;
storing the image data along with the access authority levels;
comparing, when receiving a request for a specific image data from a user having a user access authority level, the user access authority level and the access authority level assigned to the specific image data; and
selectively providing the specific image data to the user based on a comparison result of the user access authority level and the access authority level assigned to the specific image data,
wherein the image data is encrypted by the network camera before being transmitted to the security management server,
wherein the image data is spatially or temporally masked by the network camera before being transmitted to the security management server,
wherein the image data is encrypted by using an encryption key,
wherein the image data is masked by using a masking key,
wherein the user access authority level is classified into a low, a medium, or a high level, and
wherein said selectively providing the specific image data to the user includes:
providing to the user the specific image data only, if the user access authority level is the low level;
providing to the user the specific image data along with the encryption key, if the user access authority level is the medium level; and
providing to the user the specific image data along with the encryption key and the masking key, if the user access authority level is the high level.

7. The method of claim 6, further comprising:
performing user authentication for the user,
wherein the specific image data is provided to the user only if the user authentication is successful.

8. The method of claim 6, further comprising:
transmitting to the network camera an object tracking command along with feature information of a target object.

9. The method of claim 8, further comprising after said transmitting the feature information:
notifying, when one network camera finds the tracking target object, other network cameras that the tracking target object has been found.

10. The method of claim 6, wherein in said assigning the access authority level, the access authority level is assigned to each image data based on a location where the network camera is installed and a time when the network camera transmits the image data to the security management server.

* * * * *